(12) United States Patent
Alamuri

(10) Patent No.: US 10,523,699 B1
(45) Date of Patent: Dec. 31, 2019

(54) PRIVILEGE ESCALATION VULNERABILITY DETECTION USING MESSAGE DIGEST DIFFERENTIATION

(71) Applicant: Amazon Technologies, Inc., Seattle, WA (US)

(72) Inventor: Naga Venkata Sunil Alamuri, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 15/627,943

(22) Filed: Jun. 20, 2017

(51) Int. Cl.
*H04L 29/06* (2006.01)

(52) U.S. Cl.
CPC .......... *H04L 63/1433* (2013.01); *H04L 63/08* (2013.01); *H04L 63/102* (2013.01)

(58) Field of Classification Search
CPC ... H04L 63/1433; H04L 63/102; H04W 12/08
See application file for complete search history.

(56) References Cited

U.S. PATENT DOCUMENTS

| | | | | |
|---|---|---|---|---|
| 8,484,152 | B2* | 7/2013 | Hoglund | G06F 21/562 706/52 |
| 9,411,973 | B2* | 8/2016 | Factor | G06F 21/6218 |
| 9,473,522 | B1* | 10/2016 | Kotler | H04L 63/1433 |
| 2008/0148408 | A1* | 6/2008 | Kao | G06F 21/577 726/25 |
| 2009/0164522 | A1* | 6/2009 | Fahey | H04L 63/1441 |
| 2009/0271863 | A1* | 10/2009 | Govindavajhala | G06F 21/577 726/23 |
| 2014/0089202 | A1* | 3/2014 | Bond | H04L 9/0822 713/166 |
| 2014/0106710 | A1* | 4/2014 | Rodriguez | H04M 1/7253 455/411 |
| 2016/0088000 | A1* | 3/2016 | Siva Kumar | H04L 63/083 726/23 |
| 2016/0164904 | A1* | 6/2016 | Alamuri | H04L 63/1433 726/25 |
| 2016/0337392 | A1* | 11/2016 | Weng | G06F 21/577 |
| 2018/0091310 | A1* | 3/2018 | Branco | H04L 9/0643 |
| 2018/0343271 | A1* | 11/2018 | Tenorio | H04L 63/1408 |

FOREIGN PATENT DOCUMENTS

EP          3099037 A1 * 11/2016 ........... H04L 63/105

* cited by examiner

*Primary Examiner* — Ponnoreay Pich
(74) *Attorney, Agent, or Firm* — Davis Wright Tremaine LLP

(57) ABSTRACT

Techniques described and suggested herein include various systems and methods for detecting privilege escalation vulnerabilities. A detection service may determine one or more resources of a service or application the computing resource service provider to test. The detection service may determine a set of message digests corresponding to responses to requests to access the resource of the service or application. A subset of the set of message digests associated with an identifier may be compared to determine whether an entity associated with one of the subset of message digests is able to exceed a set of privileges attributed to the entity.

20 Claims, 9 Drawing Sheets

PRIVILEGE ESCALATION VULNERABILITY DETECTION USING MESSAGE DIGEST DIFFERENTIATION

BACKGROUND

Services, applications, and other based data exchanges may have vulnerabilities that are difficult to detect or protect against. Each user account for these services may be authorized to access resources and/or services according to the access rights or privileges associated with the account. The access privileges for each account are usually assigned or allocated by an administrator or developer having authority to adjust the scope of the assigned privileges. If authorization and authentication controls are improperly implemented, latent or unknown vulnerabilities may arise that, if exploited, may allow a user to gain access to services and/or resources to which the user should not be allowed to access based on their defined privileges. Detection of such latent or unknown vulnerabilities, however, is a complex problem. By their nature, such privilege escalation vulnerabilities are difficult to detect, either prospectively or retrospectively. As a result, conventional techniques of preventing unauthorized users from accessing and/or manipulating data often require significant time and resources to be effective

BRIEF DESCRIPTION OF THE DRAWINGS

Various techniques will be described with reference to the drawings, in which.

DETAILED DESCRIPTION

Figure 1:
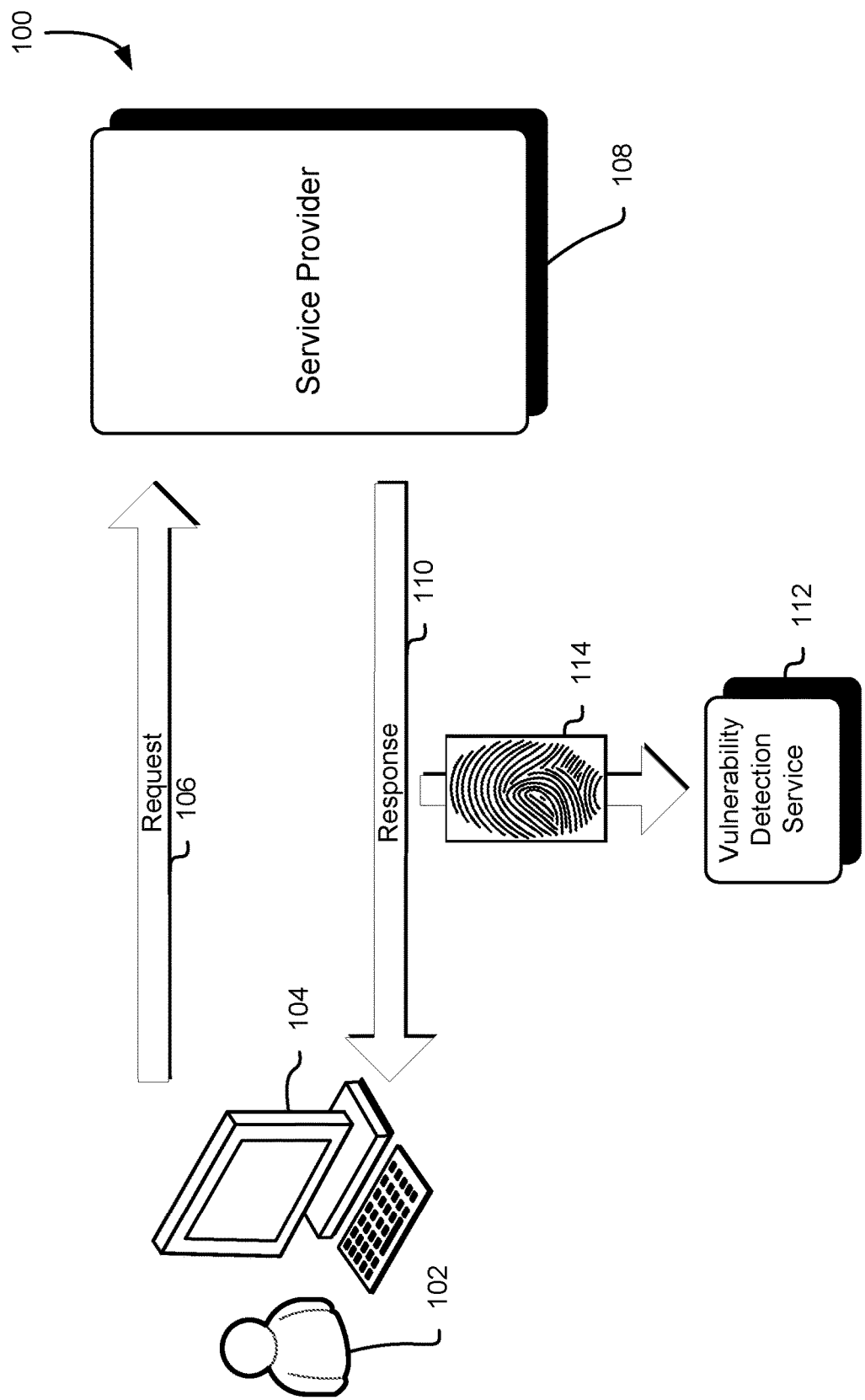
FIG. 1 shows an illustrative environment in which embodiments of the present disclosure may be practiced.

Techniques described and suggested herein include detecting privilege escalation in web services and web applications, such as by accessing various aspects of web services to determine message digest responses for different users and comparing the digests obtained. Such systems and methods enable the ability to detect the existence of privilege escalation vulnerabilities before they are exploited.

Computing resource service providers provide users with remote access to web services, resources, and applications. Access privileges or rights may be associated with each user defining which services and/or resources the user should be permitted to access. For instance, access privileges may permit a user to access a cloud-based word processing application and web service associated with a particular company. Access privileges may also define levels of access within a service or resource that an associated user should be permitted to access. As one example, access privileges may permit a user to perform certain operations on a particular document in the cloud-based word processing application, such as viewing or editing. As another example, access privileges may permit a user to access a document management service associated with a business entity or edit a website associated with a business entity. Access privileges for each user or group of users may be defined by a system administrator or other entity provided with authority to manage access privileges associated with one or more web services or applications. Although the descriptions below may refer to detection as it relates to web services or applications, those of ordinary skill in the art will understand that such descriptions may also be applicable generally to resources provided by a computing resource service provider.

A privilege escalation vulnerability may exist where a user or process is able to gain access to resources or services other than those that the system administrator intended to be assigned. Such vulnerabilities may expose sensitive information of an entity or allow an unauthorized user to tamper with, destroy, or corrupt the entity's data. Privilege escalation vulnerabilities are difficult to detect before they are exploited. The techniques disclosed and suggested herein allow security vulnerabilities, including privilege escalation vulnerabilities, to be prospectively identified in a system without waiting for unauthorized users to exploit them. Unauthorized users, as disclosed herein, are users who are able to obtain privileges associated with non-public applications, services, or resources other than those that an entity having authority to grant or modify access privileges intended for the user to have.

The techniques described in this document provide other advantages. By way of non-limiting example, the systems and methods disclosed herein enable detection of a privilege escalation risk that may occur as a result of fulfillment of a request from an unauthorized user. As another example, the techniques disclosed herein allow detection of a privilege escalation risk that may exist as a result of the response provided to a non-authorized user fulfilling a request to access an application, services, or resources exceeding the scope of the access privileges that an administrative entity intended to grant for the user. Further, one or more remediation actions may be performed based on the detection of a privilege escalation risk to mitigate or circumvent user or process access of applications, services, or resources to which the user or process should not be allowed. Those of ordinary skill in the art will understand that these and other benefits may be achieved based on the description provided herein.

In examples discussed more thoroughly below, a vulnerability detection service may perform several steps to identify vulnerabilities associated with a web application, service, resource, etc. The detection service may obtain information regarding content of the web application including web pages and domains associated therewith. The detection service may also determine a set of users to evaluate in connection with the application. For each user, the service may obtain a listing, class, or group of uniform resource identifiers to which the administrator has authorized the user to have access. The vulnerability identification processes may include determining a user having maximum permissions or access privileges to the web application, an unauthenticated user who does not have permissions or access privileges to access any non-public pages in the web application, and/or a user having a different privilege level The detection service may establish or initiate a session for an individual user in connection with the web application. Using the established session, the detection service may crawl the content of the web application to obtain a set of responses to a set of requests provided to the web application. The requests and/or responses may be saved into memory, such as a database. The detection service may obtain a message digest discussed corresponding to one or more of the set of responses. The message digest may be a fuzzy hash value generated using a fuzzy hashing algorithm, as discussed below. The message digest may be compared with a message digest corresponding to one or more of a set of responses for another user to determine a message digest differential. The digest differential may indicate the existence of a privilege escalation vulnerability based at least in part on a comparison of the digest differential with a digest threshold or benchmark, as discussed below in greater detail.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an illustrative example of an environment 100 in which various embodiments of the present disclosure may be practiced. In an embodiment, a user 102 may submit, via a user device 104 (e.g., personal computer, laptop, smartphone, tablet computer), a request 106 to a computing resource service provider 108. The request 106 may be a request to access a web application or service of the service provider 108, and may include one or more credentials sufficient to access a set of service provider resources associated with an account of the user 102. The service provider 108 may provide a response 110 to the request 106 based at least in part on access privileges associated with the user 102. The access privileges may indicate what resources a user is permitted to access or what actions a user is permitted to perform—such as whether the user 102 is authorized to access the web application, and/or various aspects or levels of the web application that the user 102 is permitted to access, modify, view, or otherwise interact with. For instance, the access privileges may indicate that the user 102 is permitted to access a particular document, and may further indicate that the user 102 is permitted to modify the content of the document. The access privileges may be implemented in various manners. In one embodiment, a system administrator may define or assign the access privileges for each individual user or for groups or classes of users having one or more characteristics, as described below in greater detail. In one embodiment, the access privileges may be defined or assigned according to a policy specifying conditions, such as a time, location, or manner of access, for permitting or denying access to an individual user, or groups or classes of users.

A privilege escalation vulnerability may exist where the access privileges associated with the user are different than the access privileges that should be assigned to the user. Vertical privilege escalation vulnerabilities are one type, where the access privileges associated with the user would allow the user to obtain a higher level of access than intended. Examples of vertical privilege escalation would be where a user is able to edit a document that the user should only be able to view, or where a normal user is able to access aspects of the service or application reserved for a developer or system administrator (e.g., source code). Horizontal privilege escalation vulnerabilities are another type, where the access privileges associated with the user would allow the user to access resources of another user account. Examples of horizontal privilege escalation would be where a user is able to access another user's documents or information, or where a user of one company is able to access the accounts or information of another company. The term privilege escalation vulnerability used herein is understood to encompass both vertical and horizontal privilege escalation.

A vulnerability detection service 112 may obtain a message digest 114 of the response 110 to determine whether provision of the response 110 creates or would create a vulnerability, such as a privilege escalation vulnerability, or risk associated therewith. The detection service 112 may obtain the digest 114 in several ways. In one embodiment, the detection service 112 may obtain the response 110 and generate the digest 114 from the response. The detection service 112 may be a service of the service provider 108 or maybe a service separate therefrom. The detection service 112 may obtain the response 110 before the response 110 is transmitted to the user 102, such as by intercepting the response 110. The service provider 108 may be configured to operate according to the policy under which the detection service 112 is provided with the response 110 for review prior to transmission to the user 102. Approval of the response 110 by the detection service 112 may be a condition precedent to transmission of the response content to the user 102. In one embodiment, a digest generator separate from the detection service 112 may generate the digest 114 from the response 110 and transmit digest 114 to the detection service 112. In one embodiment, the digest 114 may be generated from a response 110 generated by the service provider 108 in response to a hypothetical request not actually submitted by a user. That is, the detection service 112 may cause a request generated for testing purposes to be provided to the service provider 108 to determine a response 110 that would be provided if the request was actually submitted by a user. Therefore, the detection service 112 may be able to identify vulnerabilities without having to expose the service provider 108 to actual risk.

The detection service 112 may be configured to communicate or interact with services of a computing resource service provider to identify or detect privilege escalation risks or vulnerabilities. The service may be part of a process, application, service or process implemented by execution of executable code stored on programmable memory (e.g., ROM, RAM, FPGA, etc.). The service may be part of the computing service provider or may be a service separate from those provided by a different service provider or its own service. The service is authorized such that a set of other services would determine that it is appropriate to fulfill requests sent to the set of other services for detection of privilege escalation risks or vulnerability.

Figure 2:
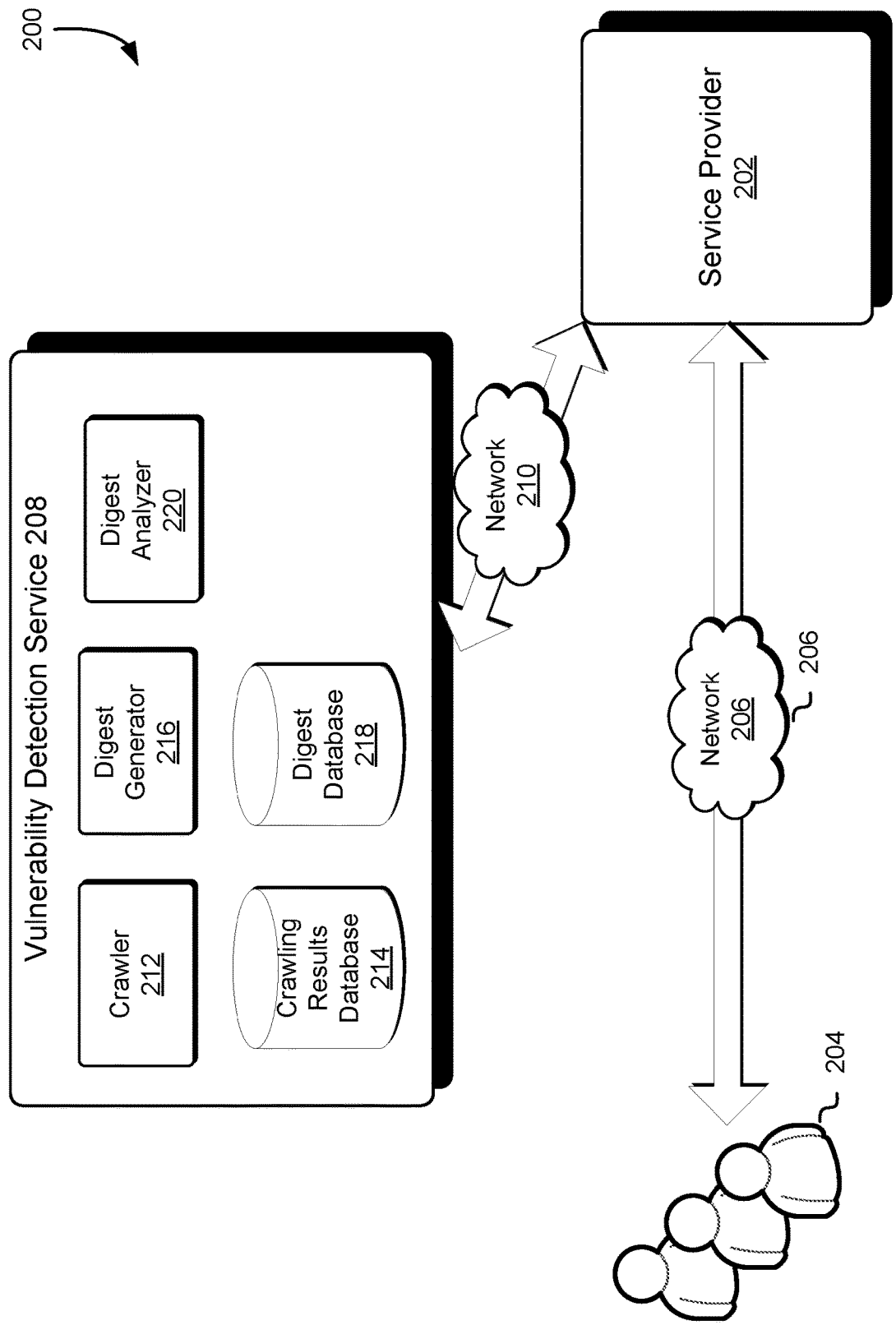
FIG. 2 shows an illustrative environment in which a vulnerability detection service may operate.

FIG. 2 is an illustrative example of an environment 200 in which a service provider 202 is configured to communicate with a set of users 204 over a network 206. The network 206 may be a wide-area network such that the service provider 202 and the users 204 are located on separate local area networks (i.e., remotely-located). The service provider 202 is configured to process requests from the set of users 204 as described above. A vulnerability detection service 208 is configured to interact with the service provider 202 over a network 210. The network 210 may be a local area network such that the service provider 202 and the detection service 208 are located within the same local network. In one embodiment, the network 210 may provide a communications link between separate local area networks. The detection service 208 may be in a trust domain with the service provider 202 such that the detection service 208 is authorized to obtain sensitive information, such as information regarding access privileges of the users 204 and resources of the service provider 202.

The detection service 208 may comprise several distinct components involved in detection of vulnerabilities and risks. The components may comprise a crawler 212, a crawling results database 214, a digest generator 216, a digest database 218, and a digest analyzer 220. The components of the detection service 208 are depicted as being centralized under the detection service 208. The components may be run on one or more computer systems of the service provider 202, either separately or in concert with one another.

The crawler 212 is a computer or software application, utilized by a computing resource, that is configured to initiate communications with applications or services of the service provider 202 (e.g., web crawler, application crawler, service crawler). The crawler 212 may be configured to use user information to establish a communications session with the application or service for transmitting and receiving communications as the user. The communications session may be a cryptographically protected communications session established according to a secure communications protocol (e.g., SSL, TLS, AES, DES). The crawler 212, upon establishing the session, may iteratively access links and/or resources of the application, following additional links and/or resources encountered, to create a mapping of the links and/or resources available to the user. Crawling the application may include transmitting a request to the application to access a resource or link, and receiving responses from the application. Crawling the application may include, after successfully accessing a link or resource, attempting to access further resources contained therein. The crawler 212 may identify the available or accessible links and/or resources, store identifying information (e.g., URI, URL) of the links and/or resources in a crawling results database 214 in association with the service and user used to access the service, and store requests to access the links and/or resources and responses thereto for one or more users (e.g., user having maximum privileges, user having minimum privileges, user under test).

The crawler 212 may be any computing resource or collection of computing resources configured to crawl data objects of an application or service, as described below. The crawler 212 may be a service or subservice of the computing resource service provider. The crawler 212 may be implemented using hardware, software, and a combination thereof. In some cases, the crawler 212 supports one or more APIs that the detection service 208 may use to crawl resources of applications or services of the service provider 202.

The detection service 208 may also include a digest generator 216 that is software or an application, utilized by a computing resource, configured to generate a message digest of data objects. The digest generator 216 may use a fuzzy hashing algorithm to generate a digest of one or more data objects from another component of the detection service 208, such as the crawling results database 214 or from the crawler 212. In one embodiment, the digest generator is configured to obtain a response from the application accessed by the crawler 212 and generate a digest of the response obtained. The digest generator 216 may cause the digest generated to be stored in a digest database 218 in association with the user or the application corresponding to the response used to generate the digest.

The digest generator 216 may be any computing resource or collection of computing resources configured to generate a message digest of data objects using a fuzzy hashing algorithm, as described below. The digest generator 216 may be a service or sub service of the computing resource service provider. The digest generator 216 may be implemented using hardware, software, and a combination thereof. In some cases, the digest generator 216 supports one or more APIs that the detection service 208 may use to generate message digests.

The message digest referenced herein refers to the representation of a data set (e.g., file) to a bit string using a fuzzy hashing algorithm. Fuzzy hashing algorithms may generate robust message digests or fuzzy hash values that are a digest of an instance of content (e.g., audio, video, text and or other types of content and combinations of types of content, which is not necessarily media content renderable for human consumption) calculated using an algorithm having the properties that performance of the algorithm on different digital representations of an instance of content result in a similar calculated robust message digest and such that there is a second set of changes to the digital representation that, if made, would result in a different robust message digest. In other words, the fuzzy hashing algorithm is an algorithm that can be used to identify or match data sets that are not identical but which may be different in content and/or size—for example, a context-triggered piecewise hashing algorithm (CTPH).

Using normal hashing algorithms, such as MD5 and SHA, to generate a message digest of two similar but different data objects would result in two completely different message digests despite the similarity of the data objects. This is because most hashing algorithms are very sensitive to the alignment of each and every byte within the data object—a change in one byte between the data objects would result in a completely different hash digest. By contrast, fuzzy hashing algorithms have a property of being robust to alignment changes of bytes, such that a fuzzy hash of two similar data objects may produce similar fuzzy hashes because portions of a first data object may be aligned similar portions as a second data object similar to the first. In such instances, where a first data object is modified (e.g., by insertion, deletion of content therein) to produce a second data object, the fuzzy hashes of the first and second data objects would be similar. Therefore, these hashes can be used to identify modified or similar versions of known data objects in sets of unknown objects even where data was deleted, added, or modified in the modified version. Accordingly, fuzzy hashing algorithms can produce output values that match based on inputs that are similar but different. Specifically, the output values may comprise several piecewise sections that are identical, but some differing sections of the inputs may cause differences in corresponding piecewise sections of the outputs, although the similarity between the overall inputs may still be considered as "matching" or having a correspondence. Corresponding output values for identical inputs may match by being identical. In some embodiments, corresponding output values for similar but different inputs may different but generated such that there is a method of determining whether two different values match. For example, the output values may be vectors and a metric can be applied to determine whether the distance between two vectors is within a threshold. As another example, a set of rules can be applied to determine whether there is a match between output values. Another component of the detection service 208 may be a message digest analyzer 220 that is configured to obtain and analyze message digests to determine a privilege escalation vulnerability or risk. The digest analyzer 220 is software or an application, utilized by a computing resource, that is configured to interact with other components of the detection service 208 to obtain and analyze message digests. For instance, the digest analyzer 220 may obtain, from the digest generator 216 or the digest database 218, the digest of response corresponding to a request of a user U1 having maximum permissions or access privileges to the application being tested. The digest analyzer 220 may also obtain, from the digest generator 216 or the digest database 218, the digest of a response corresponding to a request of a user U2 having different access privileges to the application than the access privileges of the user U1. In one embodiment, the digest analyzer 220 may obtain the digests from other services or databases of the service provider 202.

The digest analyzer 220 may be any computing resource or collection of computing resources configured to compare and analyze message digests. The digest analyzer 220 may be a service or subservice of the computing resource service provider. The digest analyzer 220 may be implemented using hardware, software, and a combination thereof. In some cases, the digest analyzer 220 supports one or more APIs that the detection service 208 may use to analyze digests generated by the digest generator 216.

After obtaining the digest pair, the digest analyzer 220 may compare the digests to determine how similar the digests are to each other. The digest analyzer 220 may generate a score indicating a degree of similarity of the digests, such as a percentage or number of identical or similar sections. In one embodiment, the digests may comprise several distinct sections (e.g., pages, paragraphs, images, content, header, footer) and the digest analyzer 220 may analyze corresponding sections of the digest for U1 and sections of the digest for U2 to generate a set of scores indicating similarity of the sections. The digest analyzer 220 may compare the score or set of scores to a digest similarity range or threshold to determine whether a vulnerability may exist. In particular, the digest analyzer 220 may determine that a privilege escalation vulnerability or risk does not exist as a result of the score being within an acceptable range of similarity defined by the reference value. As one hypothetical example, if the score is determined to be 0.85 and the reference range is ≤0.90, the digest analyzer 220 will determine that the score for the digest comparison does not represent a privilege escalation vulnerability because the digests are sufficiently different from each other. As another example, if the score is determined to be 0.92 and the reference range is ≤0.90, the digest analyzer 220 will determine that the score for the digest comparison represents a privilege escalation vulnerability because the digests are insufficiently different from each other. The reference value may be a value or set of values determined by an authorized entity and stored into memory, such as a database. The digest analyzer 220 may maintain storage of the digest reference in memory accessible to the digest analyzer 220, or may obtain the digest reference from another component of the detection service 208 (e.g., digest database 218) or another service of the service provider 202. As a result of determining the existence of a privilege escalation vulnerability or risk, the detection service 208 may cause one or more remediation actions to be implemented, as discussed below.

Figure 3:
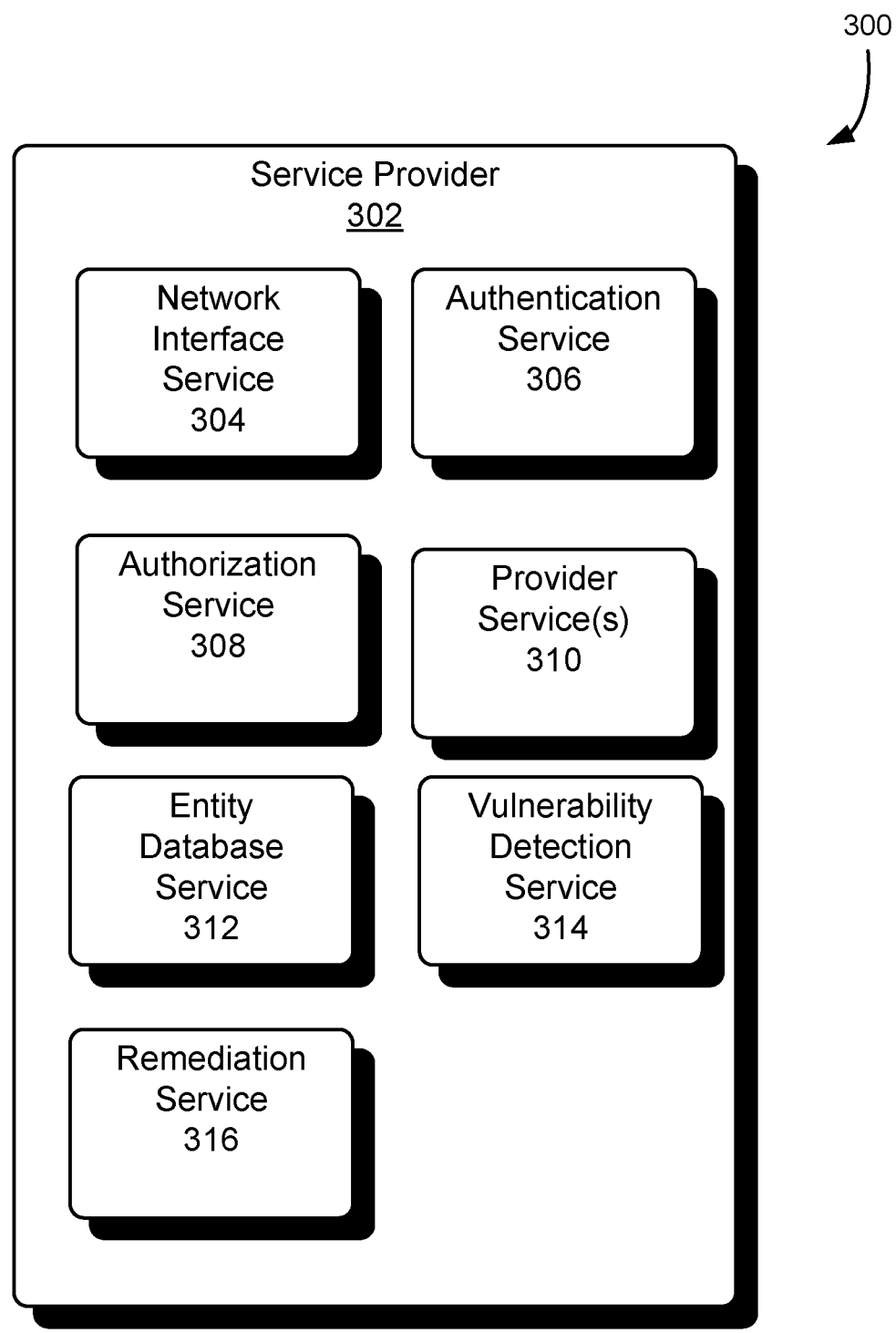
FIG. 3 shows an example set of services provided by a service provider.

As discussed herein, the computing resource service provider may provide a number of services in connection with web services and applications used by its customers. FIG. 3 is an illustrative example of an environment 300 in which one or more services provided by the computing resource service provider 302 in accordance with at least one embodiment. The services provided by the computing resource service provider, in this example, include a network interface service 304, an authentication service 306, an authorization service 308, one or more other provider service(s) 310, an entity database service 312, a vulnerability detection service 314, and a remediation service 316, although not all embodiments of the present disclosure will include all such services and additional services may be provided in addition to or as an alternative to services explicitly described herein. As discussed below, the services provided may operate according to code executing on a collection of computing devices.

The network interface service 304 is configured to enable network communications between the service provider and a customer. A customer client device may request access to services of the service provider 302 via the network interface service 304 over one or more networks. The user client device may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The one or more networks may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others. The network interface service 304 may also enable communications between one or more of the services of the service provider 302.

The service provider 302 may include the authentication service 306 for authenticating credentials of a user, computer system, process, or other such entity to at least verify the authenticity of the user, system, process, or entity in connection with accessing various applications and services provided. The authentication service 306 in an embodiment is a computer system configured to perform operations involved in authentication of the users, process, service, etc. For instance, the network interface service 304 may provide information received from a user to the authentication service 306 to receive information in return that indicates whether or not user requests are authentic. Determining whether user requests are authentic may be performed in any suitable manner and the manner in which authentication is performed may vary among the various embodiments. Authentication may be performed by verifying that one or more authentication conditions are satisfied in association with the user. In one embodiment, users may electronically sign messages transmitted to the service provider 302. Electronic message digests may be generated using secret information (e.g., a private key of a key pair associated with a user) that is available to both an authenticating entity (e.g., user) and the authentication service 306. The request and digests for the request may be provided to the authentication service 306 which may, using the secret information, compute a reference message digest for comparison with the received digest to determine whether the request is authentic. The authentication service 306 may retrieve user information from the entity database service 312, as discussed below.

If the request is authentic, the authentication service 306 may provide information to one or more other services of the service provider 302 indicating that the user is verified as authentic—that is, that the user is who the user claims to be. The information may include an indication that the user is verified, such as a cookie or token usable use to prove to other services, such as the other provider services 310, that requests from the user are authentic, thereby enabling the other services to operate accordingly. For example, the authentication service 306 may provide a token that another service can analyze to verify the authenticity of the request. Electronic digests and/or tokens may have validity that is limited in various ways. For example, electronic digests and/or tokens may be valid for certain amounts of time. In one example, electronic digests and/or tokens are generated based at least in part on a function (e.g., a Hash-based Message Authentication Code) that takes as input a timestamp, which is included with the electronic digests and/or tokens for verification. An entity verifying a submitted electronic digest and/or token may check that a received timestamp is sufficiently current (e.g. within a predetermined amount of time from a current time) and generate a reference digest/token using for the received timestamp. If the timestamp used to generate the submitted electronic digest/token is not sufficiently current and/or the submitted digest/token and reference digest/token do not match, authentication may fail. In this manner, if an electronic digest is compromised, it would only be valid for a short amount of time, thereby limiting potential harm caused by the compromise. It should be noted that other ways of verifying authenticity are also considered as being within the scope of the present disclosure, such as username/password, token authentication, digital certificate verification, message digest verification, and/or other network authentication protocols, including Kerberos.

The service provider 302 may include the authorization service 308 which may authorize a user, computer system, process, or other such entity to at least determine which actions of one or more possible actions that entity may perform in connection with accessing various applications and services provided. For example, actions an entity may or may not be authorized to perform may be accessing a service or application, such as a cloud-based virtual machines or website hosting, or accessing a data object, such as a document or media file. As another example, actions the entity may or may not be authorized to perform may be accessing various functions or content in connection with a service, application, or data object which the entity is generally permitted to access. That is, the entity may be permitted administrative or developer privileges in connection with a cloud-based website associated with a website development service, or may be permitted privileges to edit a cloud-based document of a document management service. Determination of access privileges by the authorization service 308 is discussed in further detail with respect to FIG. 5. The authorization service 308 may provide the provider services 310 and/or applications with an indication of what access privileges the user is permitted.

The actions that the authorization service 308 may authorize an entity to perform may be static or may vary according to a number of factors including, but not limited to, time of day, type of credentials, system policies, nature, type or location of the object being accessed or a combination of these and/or other such authorization factors. For example, a computer system entity may be authorized only to read certain files on a file system, to read and write certain other files on a file system, and to add and delete certain other files on a file system. A different computer system entity may be authorized to perform any actions on the file system, but only if those actions are initiated from a certain location and at a certain time. One or more processes may be authorized only to write to a file on a file system, such as, for example, a system log, while other processes may only be authorized to read from the file. As may be contemplated, these are illustrative examples. Other types of operations may be authorized by the authorization service 308 and such other types of operations are discussed with also considered as being within the scope of the present disclosure.

The service provider 302 may provide a set of provider services 310. The provider services 310 may include cloud-based services such as virtual computing services, website development services, website/domain hosting services, data storage services, content delivery services, by way of non-limiting example. The provider services 310 may also include various applications such as email applications, document management applications, word processing applications, media transcoding applications, workflow applications, and data searching applications, also by way of non-limiting example. The user may be permitted to access the services and/or applications based on the access rights authorized to the services by the authorization service 308.

An entity database service 312 may be a collection of computing resources collectively configured to maintain, manage, and provide information corresponding to user accounts, users, services and other information corresponding to users or the service provider 302. For example, the entity database service 312 may be a computer system responsible for maintaining user information such as username, authentication information (e.g., passwords, public key, private key, digital signature, digital certificate, token), account history, user associations with business entities, and services to which the users may have access privileges. The entity database service 312 may also receive requests from the authentication service 306 for information corresponding to a particular user. For example, the authentication service 306 may request additional information from the entity database service 312 corresponding to a particular user's private key or public key. As the information maintained by the entity database service 312 is sensitive, the entity database service 312 may be configured to interact with a select group of services, including the authorization service 306 and the vulnerability detection service 314.

The vulnerability detection service 314 may be a service configured to detect one or more vulnerabilities in the computing resource service provider. One aspect of the vulnerability detection service 314 is the ability to detect privilege escalation vulnerabilities, as discussed herein. The vulnerability detection service 314 is configured to interact with other services of the service provider 302 to detect vulnerabilities. For instance, the vulnerability detection service 314 may interact with the authorization service 308 to determine access privileges for users in connection with the provider services 310. The vulnerability detection service 314 may also interact with the database service 312 to obtain user information for accessing the provider services 310. The vulnerability detection service 314 may compile a list of the types of users for one or more of the provider services 310, such as administrative user, developer, editor user, organizational user, and system user, by way of non-limiting example. For each of the provider services 310, the vulnerability detection service 314 may have access to user information for a user $U_{MAX}$ having maximum access privileges to the service such that the user $U_{MAX}$ has the highest or most access privileges to the service, and a user $U_{MIN}$ having the lower or least access privileges to the service. In one embodiment, the user $U_{MAX}$ has complete access privileges such that no aspect of the associated service is inaccessible. In one embodiment, the user $U_{MIN}$ has no access privileges such that all aspects of the associated service are inaccessible. One or both of the users $U_{MIN}$ and $U_{MIN}$ may be actual users or may be virtual users not corresponding to real-world users.

The vulnerability detection service 314 may compile a list of one or more of the starting point and domains of one or more of the provider services 310 to be tested, and a list of the users associated with the one or more provider services 310 to be tested, including users $U_{MAX}$ and $U_{MIN}$. For instance, the detection service may compile a list, for each user included in the testing, of resource (e.g., URLs, URIs, HTTP requests) that the user is authorized to access. For each of the users, the vulnerability detection service 314 may initiate a session with one of the provider services 310 to be tested. The session may be a communications session established as described above with respect to the crawler 212 of FIG. 2. Within the session of a user interacting with the application or service under test, the vulnerability detection service 314 may crawl the application or service under test to access each resource that can be reached. Crawling may include, for each resource of the application or service (including users $U_{MAX}$ and $U_{MIN}$), providing a request to the resource and obtaining a resource response, and storing the request and response to the request in association with the respective user.

Crawling, as described herein, refers to a process of iteratively retrieving objects of an application, service, or resource in a methodical manner extract content from the object or gather information regarding the objects. For instance, crawling may refer to the navigation of pages of a web application or service to obtain information regarding a response to a request submitted to access a resource on a page or by accessing links on a page to discover additional pages. The pages, content, and resources of the web application may be indexed for future use. Requests to access a resource may include requests to download, modify, view or otherwise access data objects or services (e.g., documents, webpage, media streaming, website content development). The objects browsed may be a specified subset of a set of all known objects associated with the application, the set of all known objects associated with the application, or one or more objects accessible by the service. Crawling may be implemented as the result of execution of executable code causing the service to crawl in a manner defined by the code, and may be configured by a user using a graphical user interface (GUI).

The vulnerability detection service 314 may generate a message digest of each of the responses received. In one embodiment, generation of the message digest may include computing a fuzzy hash of the response. The vulnerability detection service 314 may determine a message digest differential between the digest of a response of a first user and the digest of a response of a second user, where the first and second user may have different access privileges. The vulnerability detection service 314 may ascertain which resources the first user and the second user can access, and which resources, if any, either user should not have access to. For example, based on the digest differential determined, the vulnerability detection service 314 may be able to determine whether one of the users has obtained access privileges other than those originally assigned or defined (i.e., that the user should not be able to access). That is, the vulnerability detection service 314 may determine, based on the digest differential, that the access privileges of a user exceed the scope that an entity authorized to provision access privileges intended. The vulnerability detection service 314 may provide an indication, for the access privileges exceeding the intended scope, that a privilege escalation vulnerability or risk is associated with the user or application.

The remediation service 316 may perform operations to ameliorate any vulnerabilities or risks detected by the vulnerability detection service 314. The remediation service 316 may cause performance of a remediation action or response based on receipt of the indication that the privilege escalation vulnerability or risk is associated with the user or application. The remediation action may be an action designed to limit, mitigate, or eliminate potential harm to services and/or information of the service provider 302. The remediation service 316, for example, may cause a notification to be provided to an authorized entity, such as a system administrator, indicating the privilege escalation vulnerability. The authorized entity may be an entity authorized to modify or restrict access privileges of users or services. In one embodiment, the response may include limiting access of a user detected as being associated with the privilege escalation vulnerability, such as by restricting the user's access one or more services or by locking out the user account. In one embodiment, the response may include restricting aspects of a service or application—for example, by restricting access to one service from another service where such access is detected to be associated with a detected privilege escalation vulnerability. The remediation action may be performed according to a security policy defining an action to be taken based on the level of risk or vulnerability.

Figure 4:
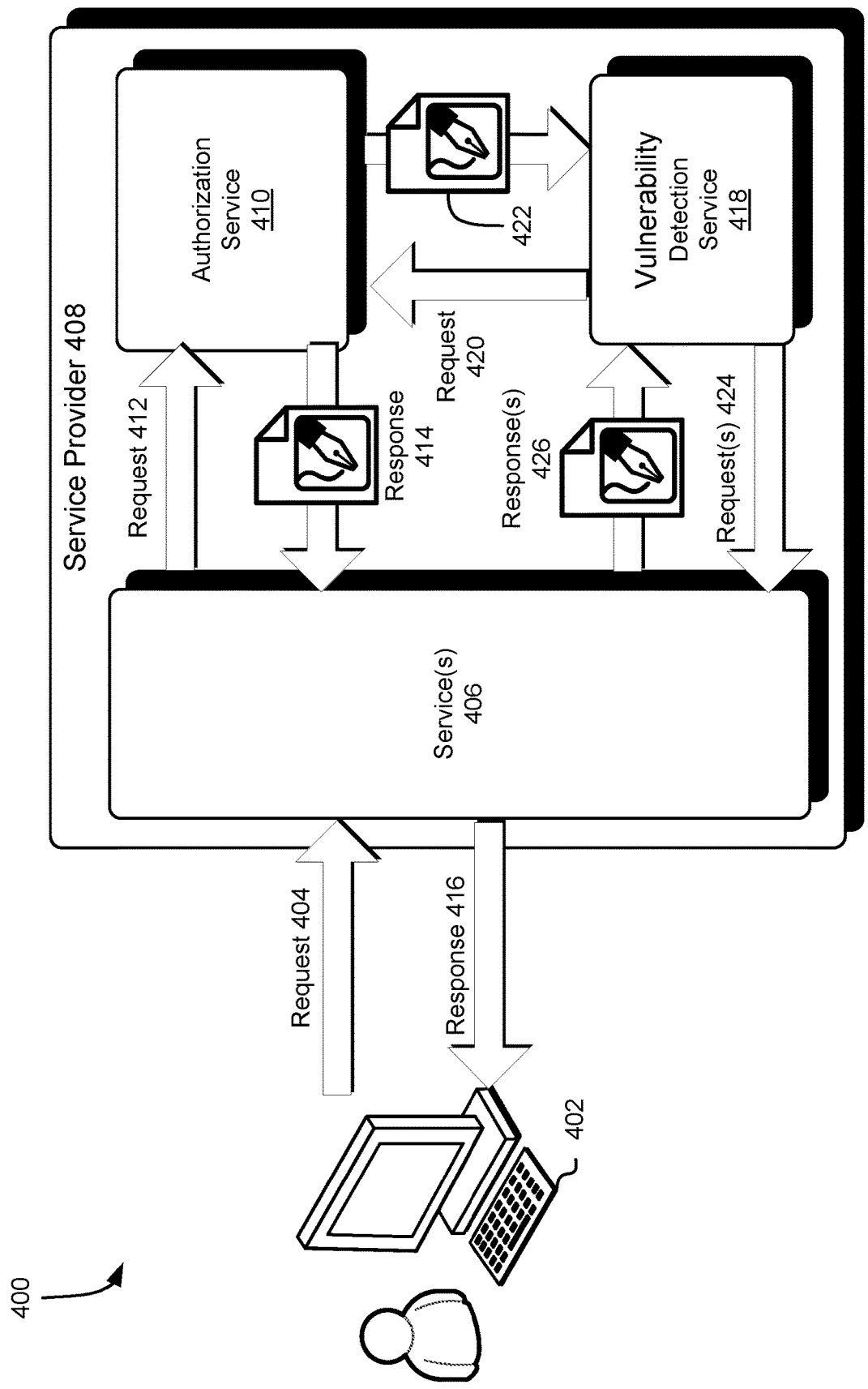
FIG. 4 shows another illustrative environment in which the vulnerability detection service may operate.

FIG. 4 is an illustration of an environment 400 in which various embodiments of the present disclosure may be practiced. The environment 400 may be a variation of the environment 200 of FIG. 2. A user 402 may submit a request 404 to a service 406 of a service provider 408 to access one or more aspects of the service 406. To determine whether the user 402 is authorized to access the one or more aspects of the service 406, the service 406 may transmit a request 412 to an authorization service 410 to provide an indication of the user's 402 access privileges to the service 406. The authorization service 410 may determine the access privileges associated with the user 402, as discussed below with respect to FIG. 5, and provide a response 414 indicating the access privileges determined. The response 414 may be digitally signed by the authorization service 410 or may include other indicia of authenticity, such as a digital certificate or token. The service 406 may provide a response 416 based on the response 414 from the authorization service 410. The response 416 may include privilege information (e.g., a set of data objects) indicating whether the user 402 is permitted access to the requested one or more aspects of the service 406. In this example, it is understood that authentication of the user is a condition precedent to provision of a response corresponding to fulfillment of the request.

In another embodiment, the request 404 provided by the user 402 may include an indication of the access privileges associated with user 402. For instance, an indication that the user 402 has been verified as authentic may be provided to the authorization service 410 in connection with an attempt to access one or more services 406. In response, the authorization service 410 may determine which access privileges the user 402 is permitted, and provide a privileges indicia (e.g., token, cookie, digital certificate) indicating the access privileges associated with the user 402 in connection with the one or more services 406. The user 402 may provide the privileges indicia to the one or more services 406 in connection with submitting the request 404 to access one or more aspects of the services 406.

A vulnerability detection service 418 may interact with the one or more services 406 and/or the authorization service 410 to determine whether a vulnerability or risk may exist in association with the service provider 408. The vulnerability detection service 418 may have elevated access privileges (e.g., similar to a system administrator or other high-level entity) and communicate with services of the service provider 408 to impersonate or mimic the actions performed by the user 402 or other services. The vulnerability detection service 418 may communicate with the authorization service 410 determine access privileges for one or more users or services in a manner similar to the service 406. In particular, the vulnerability detection service 418 may provide a request 420 to provide an indication of access privileges for set of users or set of services of the service provider 408. The authorization service 410 may provide a response 422 having privileges information (e.g., a set of data objects) indicating the access privileges requested. The response 422 (which may include indicia of authenticity as discussed above) may include privilege information that expressly indicates the access privileges or indicates the access privileges in another form, such as a digital certificate or a token.

Using privilege information provided in the response 422, the vulnerability detection service 418 may provide one or more requests 424 to the one or more services 406 to access one or more aspects thereof. The services 406 may provide one or more responses 426 indicating whether access is permitted to the one or more aspects based on the privilege information. The requests 424 and/or responses 426 may be identical to the requests 404 and/or responses 416 that would be communicated between the user 402 and the services 406. Accordingly, the vulnerability detection service 418 may accurately and precisely simulate communications between the user 402 and the services 406 without exposing the service provider 408 to risk. The requests 424 may be uniquely generated by the vulnerability detection service 418 or maybe based on requests previously provided by a user that are stored in a database. The vulnerability detection service 418 may analyze the requests 424 and or the responses 426 to detect vulnerabilities and/or risks in a manner described below in greater detail.

Figure 5:
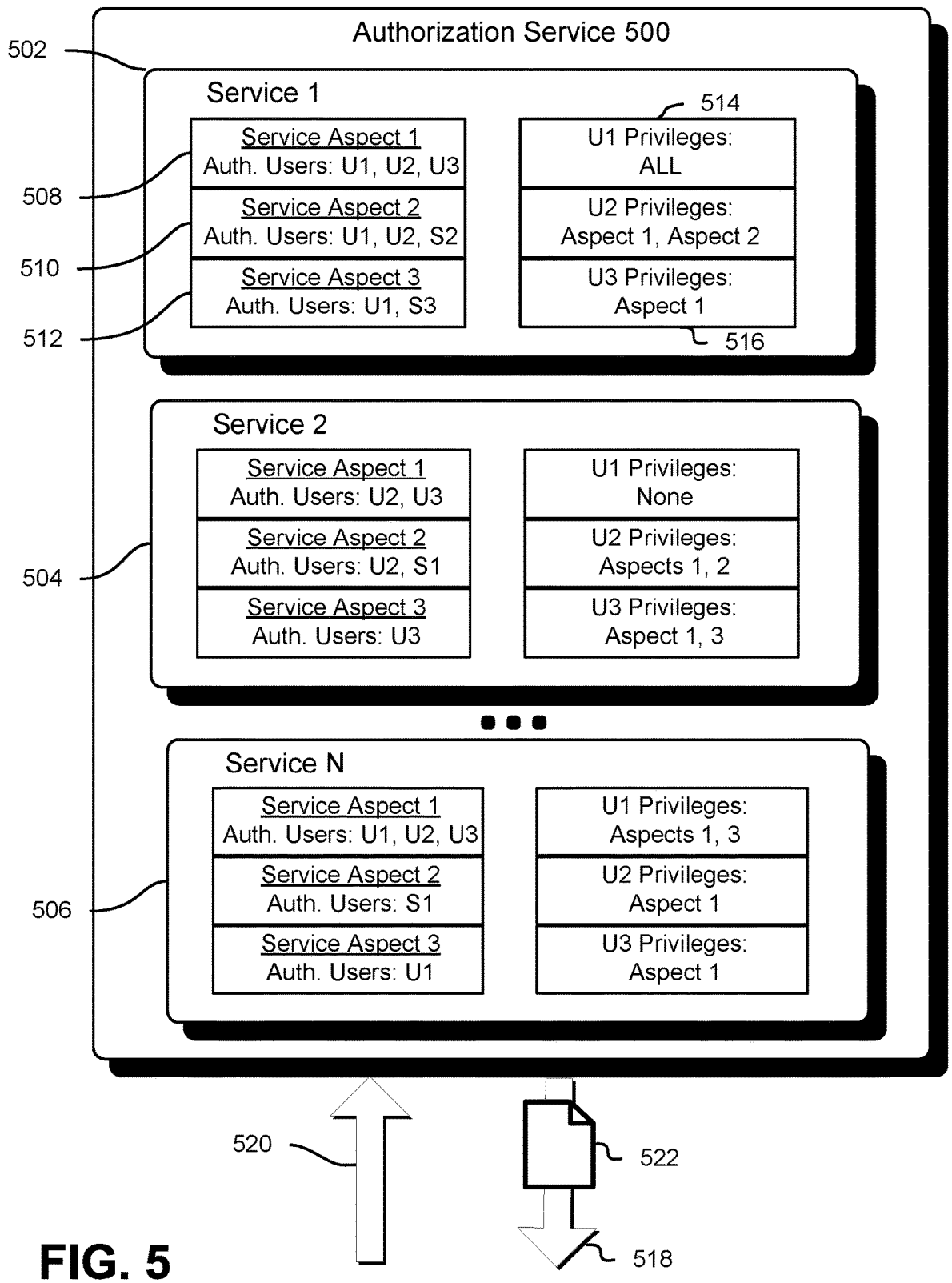
FIG. 5 shows an illustrative example of access privileges maintained by an authorization service of the service provider.

FIG. 5 is an illustration of an authorization service 500 of a service provider. The authorization service 500 is configured to manage, determine, and provide privilege information for users or services of the service provider. Privilege information may be organized according to each service. For instance, the authorization service 500 may maintain access privilege information for a first service 502 separately from access privilege information for a second service 504, or access privilege information of an Nth service 506. The privilege information may be maintained according to the aspect of the service. In the access privilege information for a first service 502, for example, users U1, U2, and U3 are permitted to access a first service aspect 508; users U1 and U2, and service S2 are permitted to access a second service aspect 510; and user U1 and service S3 are permitted to access a third service aspect 512. The privilege information may be maintained according to user or service. For example, the privilege information 514 for user U1 indicates that user U1 has access to all aspects of the first service 502 whereas privilege information 516 for user U3 indicates that user U3 has access only to the first aspect 508 of the first service 502. Instead of maintaining the privilege information according to service, as illustrated in FIG. 5, the authorization service 500 may maintain the privilege information according to user. The authorization service 500 may store the privilege information in its own database or in a separate database of the service provider. The authorization service 500 may be authorized to add, modify, or delete privilege information as requested by an authorized entity. Those of ordinary skill in the art will understand that the privilege information for each service may be different. The authorization service 500 may obtain privilege information for a service or a user in response to receiving a request 520 for the privilege information. The authorization service 500 may provide a response 518 to the request 520 that may include a data object 522 including the requested privilege information. The data object 522 may be usable by the requesting entity to access services permitted according to the privilege information. The data object may include an indicia of authenticity, such as a message digest of the authorization service 500 or a token generated by the authorization service 500.

The authorization service 500 may be any computing resource or collection of computing resources configured to manage privilege information for users and user types of the services of the service provider. The authorization service 500 may be a service or subservice of the computing resource service provider. The authorization service 500 may be implemented using hardware, software, and a combination thereof. In some cases, the authorization service 500 supports one or more APIs that other services of the service provider may utilize to interact with and obtain privilege information from the authorization service 500.

Figure 6:
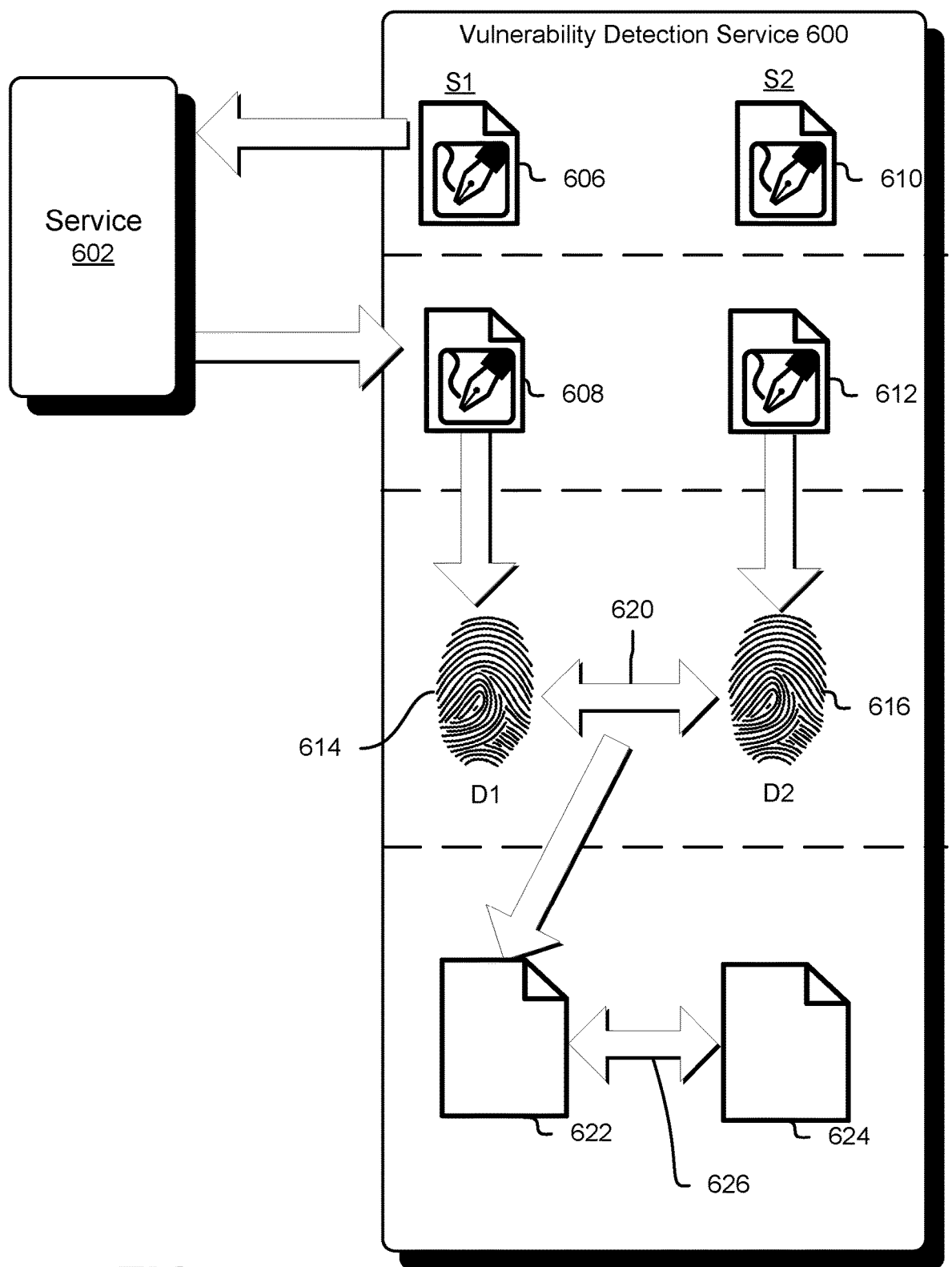
FIG. 6 shows a further illustrative environment in which the vulnerability detection service may operate.

FIG. 6 illustrates a vulnerability detection service 600 for detecting privilege escalation vulnerabilities and risks associated with a service or application 602. The vulnerability detection service 600 is a variation of the detection service 208 of FIG. 2. The vulnerability detection service 600 may obtain authentication information regarding a set of users. In the example illustrated in FIG. 6, vulnerability detection service 600 obtains authentication information of the first user and authentication information of a second user. The first user may have different access privileges than the second user—for example, the first user may have complete access privileges to all aspects of a service whereas the second user has less than complete access privileges to the service.

The vulnerability detection service 600 may initiate a first session S1 with the service or application 602 of the service provider using the authentication information of one of the users. The first session S1 established may be initiated using for the user determined to have more access privileges for the service 602 (e.g., a super user, administrative entity). The vulnerability detection service 600 may, via the established first session S1, transmit one or more requests 606, using the authentication information of the first user for instance, to access one or more resources of the service 602. In one embodiment, the vulnerability detection service 600 may crawl through the entire service 602 (i.e., using the crawler discussed with respect to FIG. 2), beginning on a starting page or resource and iteratively attempting to access every link and resource on each page. Some of the one or more requests 606 may be sent after receiving a response 608 to the request from the service 602. The vulnerability detection service 600 may store, in a communications database as described with respect to FIG. 2, one or more of the requests 606 in association with a corresponding one of the responses 608 such that each response is stored in association with the preceding request and in association with identification information of the user corresponding to the authentication information. The vulnerability detection service 600 may then establish a second session S2 with the service 602 using the authentication information of the second user. The second user may have lower or fewer access privileges for the service 602 than the first user. The vulnerability detection service 600 may then send requests 610, using the authentication information of the second user, via the established second session S2 to access one or more of the resources that were attempted to be accessed in the first session S1. One or more of the requests 610 may be to access resources to which the vulnerability detection service 600 determines the second user should not have access. The vulnerability detection service 600 may receive responses 612 to the requests 610 from the service via the established second session S2, and store the requests 610 and responses, in association with identification information of the user corresponding to the authentication information of the second user, in the same manner as described above.

The vulnerability detection service 600 may generate or calculate a message digest of one or more of the responses. A message digest 614 of the response 608 associated with the first session S1 and a message digest 616 of the response 612 associated with the second session S2. The message digests 614 and 616 may be generated using a fuzzy hashing algorithm. In one embodiment, the fuzzy hashing algorithm used to generate the message digests 614 and 616 may be a context triggered piecewise hashing algorithm (CTPH). Because the responses 608 and 612 may have different content as a result of the first user having different access privileges than the second user, the message digest 614 may be different than the message digest 616. However, because a fuzzy hashing algorithm is used, the message digests 614 and 616 may also be similar in some aspects such that a portion of the message digest 614 may be similar or identical to a portion of the message digest 616. The vulnerability detection service 600 may perform a comparison 620 between the message digests 614 and 616 to determine a difference between the message digest 614 and the digest 616. In one embodiment, the vulnerability detection service 600 may obtain the message digests 614 and 616 from another service configured to generate or calculate message digests.

In one example, the request 610 for the second user may be a request to access a service aspect of the service 602 for which the access privileges of the second user are insufficient to access. The request 606 may be a request to access the same service aspect, but for which the first user has sufficient access privileges to access. Accordingly, the message digest 616 to access the service aspect of the service 602 should be different than the message digest 614 at least because the response 612 should include a denial of access to the service aspect whereas the response 608 should include a grant of access to the same service aspect. However, the message digest 614 may be similar to the message digest 616 in other aspects. The vulnerability detection service 600 may identify similarities and/or differences between the message digests 614 and 616 in performing the comparison 620. For instance, the comparison 620 may identify portions or sections of the message digest 614 that are similar to corresponding portions or sections of the message digest 616. Conversely comparison may identify portions or sections of the message digest 614 that are different to corresponding portions or sections of the message digest 616.

The vulnerability detection service 600 may determine a digest differential 622 as a result of performing the comparison 620. The digest differential 622 may indicate how similar or how different the message digests 614 and 616 are to or from each other. The digest differential 622 may be a numerical score calculated indicating a level of similarity between the entire message digest 614 and the entire message digest 616. In one embodiment, the digest differential may be a set of numerical scores calculated indicating a level of similarity portions or sections of the message digest 614 to corresponding portions or sections of the message digest 616. The vulnerability detection service 600 may compare 626 the digest differential 622 to a digest reference 624 to determine whether a privilege escalation vulnerability or risk may exist. Because content of the response 608 should be at least partially different from content of the response 612, calculation of the message digest 614 using a fuzzy hashing algorithm should produce a hash result that is different than the message digest 616. An indication that the message digest 616 is not sufficiently different than the message digest 614 may indicate that the second user can access aspects of the service 602 to which the second user should not have privileges to access, and thus that a privilege escalation vulnerability or risk may exist. The degree to which the message digests 614 and 616 should diverge is controlled by or determined according to the digest reference 624. That is, if the digest differential 622 is outside the parameters defined by the digest reference 624, the vulnerability detection service 600 may determine that a privilege escalation vulnerability or risk exists.

Although operation of the vulnerability detection service 600 is discussed with respect to a human user, the vulnerability detection service 600 may be implemented to detect privilege escalation of a service or application of the service provider. For instance, different services may have different access privileges. Accordingly, the response 608 may be to a request using the credentials of a first service to access the service 602, and the response 612 may be to a request using credentials that should allow universal access to the service 602. In this embodiment, detection of a privilege escalation vulnerability is based on the response 608 being too similar to the response 612 such that the detection service is able to detect whether the first service has access privileges exceeding those that an administrative entity intended to assign. While the vulnerability detection service 600 is described with respect to a network-based application or service, the methods and system may be applied to an offline setting or local network setting as well. For instance, the vulnerability detection service 600 may detect privilege vulnerabilities related to accessing or logging in to local devices.

Figure 7:
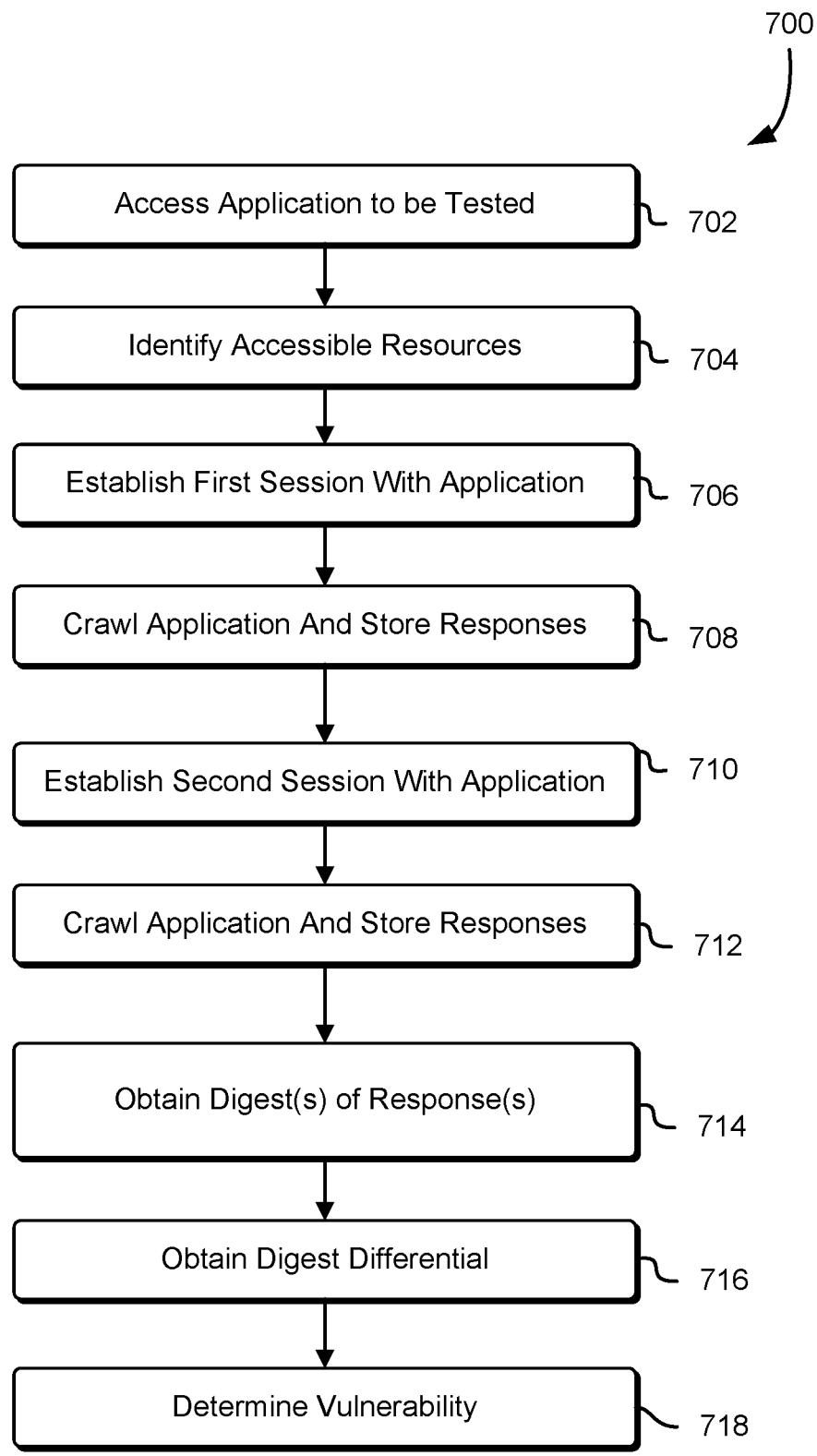
FIG. 7 shows an illustrative process for detecting a privilege escalation vulnerability of a user or user type.

FIG. 7 is an illustrative example of a process 700 of detecting privilege escalation vulnerabilities or risks with respect to a user or user type. The process 700 may be performed by any suitable set of systems or services, such as the detection service discussed herein with respect to FIGS. 1 through 6. The process 700 may be performed in response to a request to perform testing or as a part of an ongoing or periodic vulnerability detection routine. To start the process 700, the detection service accesses 702 an application or service to be tested. Accessing may include identifying a user having maximum access privileges associated with the application (e.g., user $U_{MAX}$ described above, a super user) relative to the other users or user types, and identifying a user having minimum access privileges associated with the application relative to the other users or user types (e.g., user $U_{MIN}$ described above, unauthenticated user, user having no access privileges to access non-public resources of the application). In one embodiment, accessing the application to be tested may also include identifying a specific users having a user account associated with the application, including obtaining a username and/or password associated therewith (e.g., from the entity database service discussed above with respect to FIG. 3). In one embodiment, accessing may include identifying a specific user type or class to be tested (e.g., end user, system developer). The detection service may also obtain pages or resources associated with the application access, including obtaining a starting page of the application and domains to be included in the testing.

In step 704, the detection service identifies a set of resources or aspect R1, such as uniform resource identifiers, uniform resource locators, or HTTP requests, that the identified user or user type is authorized to access. This set of resources may be identified based on the classification of each resource and whether the access privileges for the user or user type correspond to the access privileges required to access the resource or aspect. For example, in an application requiring an access privilege of editing documents to modify a document in a document management system, an "edit document" aspect of the application may be determined as being authorized for the user U1. The set of resources may be stored in association with the user or user type—for example, stored in a database accessible by the detection service.

Next, the detection service may initiate 706 a session S1 with the application under a first user. For instance, the session S1 may be established under the user $U_{MAX}$ having maximum access privileges associated with the application. Initiating the session S1 may include authenticating the user $U_{MAX}$ and obtaining session identification information, as described above. The session S1 may be a cryptographically protected communications session, as described above. The detection service may then crawl 708, via the session S1, the set of resources R1 that the user is authorized to access by submitting requests to access each of the set of resources and receiving a response to the request. Crawling 708 may include storing each of the responses in association with the corresponding request, and may also include storing the requests and responses in association with the user or user type used to establish the session S1. The requests and responses may also be stored in association with the resource of the application requested. After sufficiently crawling the application, the session S1 may be terminated. In one embodiment, a second session S1 may be established with the user $U_{MIN}$ having no access privileges to access the resources R1, and the detection service may crawl 708, via the second session S1, accessed in the first session S1 in association with the user $U_{MAX}$, as described above. The detection service may store the responses to access the set of resources R1, via the second session S1, using the user $U_{MIN}$ in addition to the first session S1.

The detection service may establish 710 a second session S2 with the application under another user U1 who does not have the elevated access privileges of user $U_{MAX}$. The user U1 may be a user specified for testing such as in a list of users to be tested, may be randomly selected, or may be a user suspected as having a privilege escalation risk associated therewith. The session S2 may be establish in a manner similar to the session S1 except that the session S2 may be established with authentication information of the user or user type U1 rather than authentication information of the user $U_{MAX}$. The detection service may then crawl 712 a set of resources of the application by submitting requests for access to the set of resources. Crawling 712 may include receiving user inputs (e.g., via user interface, previously-provided user inputs) while crawling the applications and providing the received user inputs to the resources of the application. After receiving the user inputs, crawling 712 may proceed to determine a response from the resources of the application. Crawling 712 may also include providing requests to access the set of resources R1 that the detection service requested access to in connection with the user $U_{MAX}$ in step 708. In one embodiment, the set of resources accessed or crawled in step 712 may include resources of the application to which the user U1 should not have access. The detection service may store the requests provided and the responses received in a manner similar to that described above with respect to step 708. The steps of establishing 710 a second session S2 and crawling 712 the application may be repeated for one or more other users, as described below with respect to FIG. 8.

The detection service may obtain 714 message digests of the responses received from the application. The detection service may generate or calculate a message digest of one or more responses for the user U1. For instance, the detection service may calculate the message digest of each response received in association with the requests provided for users U1 and $U_{MAX}$. In one embodiment, the detection service may also calculate the message digest of the each response received in association with the request(s) provided for user $U_{MIN}$. The message digests calculated for the user U1 may be responses corresponding to requests for resources to which the user U1 should not have sufficient access privileges to access. As discussed above, calculating the message digest may include calculating a fuzzy hash value of the response received using a fuzzy hash algorithm. The message digests calculated may be stored in association with the corresponding response used to calculate the message digest.

The detection service may compare a set of digests of one user with a set of digests of another user to obtain 716 a digest differential. For example, the detection service may compare the digest of the response generated with respect to the responses for the first session S1 (and the second session S1 when applicable) with the corresponding digest of the response generated with respect to the responses for the second session S2. The detection service may therefore determine how much the digests generated differ from one another. The detection service may generate a differential score indicating a differential between the message digests 614 and 616, for example, reflective of a difference in content of the responses provided. In one embodiment, a set of differential scores may be generated: a differential score between the user U1 and the user $U_{MAX}$, a differential score between the user U1 and the user $U_{MIN}$, and/or a differential score between the user $U_{MAX}$ and the user $U_{MIN}$. The differential score may indicate a degree of similarity between portions or sections of the respective digests and tested. The differential score may be indicative of a risk of privilege escalation vulnerability. For instance, the risk of privilege escalation may exist with respect to one or more application or service resources to which a user should not have access if the differential score is not within an expected range (e.g., is too high). Generating more than one differential score may help to obtain better analysis by covering a broader range of resource responses.

The detection service may determine 718 whether a vulnerability risk, such as a privilege escalation vulnerability risk, may exist based at least in part on a similarity of the digest differential to a digest reference, as described above. In particular, if the digest differential exceeds a target differential (i.e., the digest reference 624), then the detection service may perform a remediation action, such as providing an indication that a privilege escalation vulnerability or risk may exist with respect to the user or the user type. On the other hand, if digest differential is less than the target differential, then the detection service may determine that the user or user type does not present a privilege escalation vulnerability or risk. As discussed above with respect to FIG. 2, the digest reference may be a value, range, or set of values defining an acceptable level of similarity for the digests. The digest reference may be a predetermined value set by an authorized entity. In one embodiment the digest reference may be determined by the detection service based on a set of samples that are determined to not present a privilege escalation vulnerability or risk.

The vulnerability detection service 600 and process 700 may vary to intercept user attempts and/or provider resource resources to detect vulnerabilities in some embodiments. In one embodiment, the steps of establishing the second session 710 and crawling 712 the application may be attempts by a user to access a resource of an application or service. The vulnerability detection service 600 may receive or intercept a user's attempt to access a resource of an application or service. Thereafter, the vulnerability detection service 600 may submit the access attempt to the resource of the application that the user is attempting to access, receive the resource's response thereto, and use the response (as discussed above with respect to steps 714 through 718) to determine whether the user's access privileges exhibit a risk of privilege vulnerability. This would allow the vulnerability detection service 600 to detect, in real time, privilege escalation vulnerabilities. The vulnerability detection service 600 may cause remediation action to occur if such vulnerabilities are detected, such as by causing the authorization service to adjust the user's access privileges, modifying or restricting the response provided to the user, or to otherwise modify the user's ability to interact with the resource.

In another embodiment, the detection service may receive or intercept the application or service's response to the access attempt (see FIG. 1). Accordingly, the vulnerability detection service 600 may detect the risk of privilege escalation vulnerability, as discussed with respect to steps 714 through 718 above, and perform appropriate remediation actions when such risk is detected. In one embodiment, the responses may be stored in a queue or database (e.g., crawling results database 214 above) and asynchronously analyzed to determine whether a response already provided to the user would have presented a risk of privilege escalation vulnerability.

Figure 8:
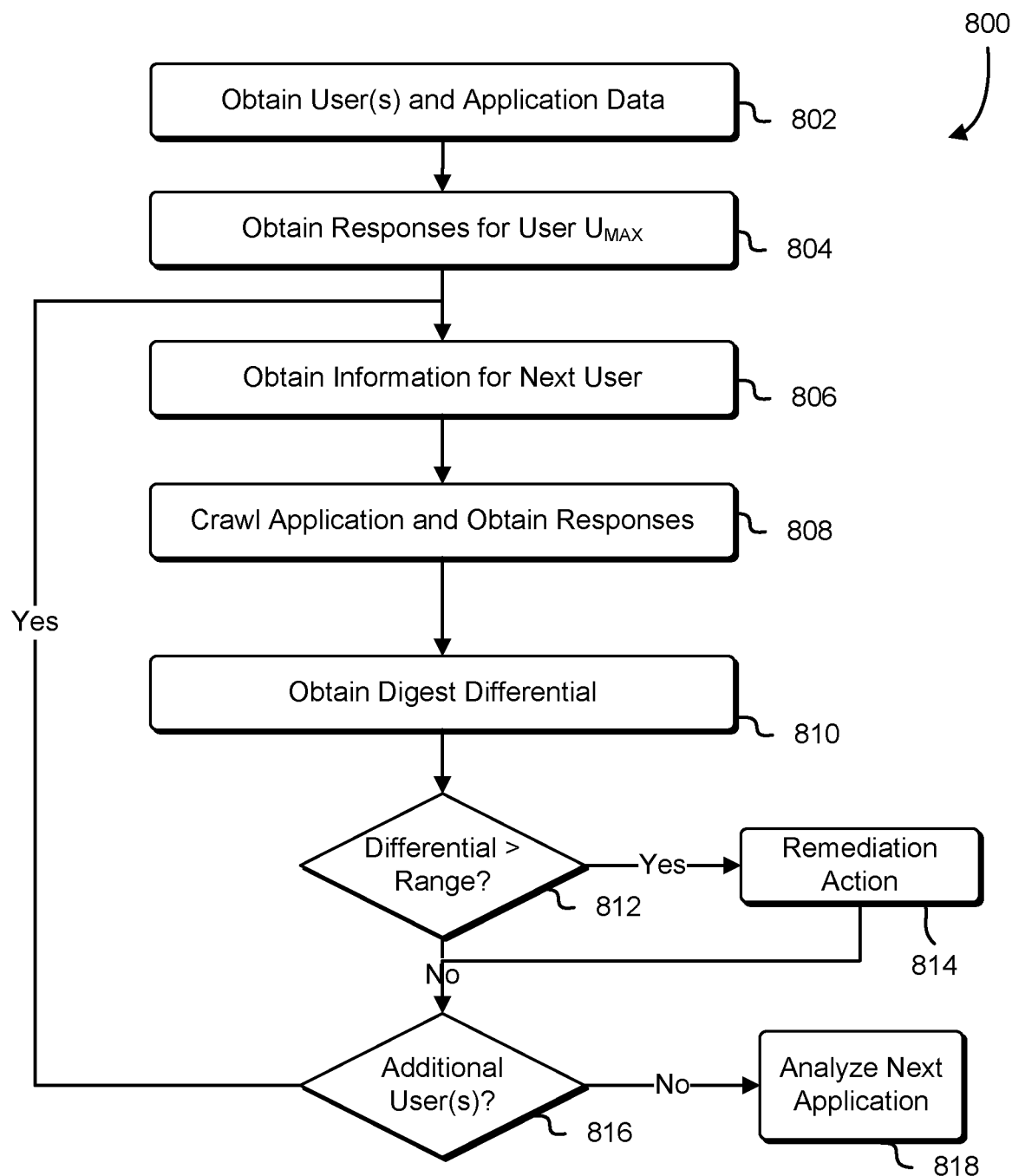
FIG. 8 shows an illustrative process for detecting a privilege escalation vulnerability of a set of users or user types.

FIG. 8 is an illustrative example the process 800 of detecting privilege escalation vulnerability or risks with respect to a set of users or user types. The process 800 may be performed by any suitable set of systems or services, such as the detection service discussed herein with respect to FIGS. 1 through 6. The process 800 may be performed in response to a request to perform testing or as a part of an ongoing or periodic vulnerability detection routine. The process begins by obtaining 802 a list of users or user types to be tested, and obtaining data regarding the application or service to be tested. Obtaining the list of users or user types may include obtaining a list of all users or user types having access privileges to the application to be tested. This may include identifying different types or categories of users that may exist in connection with the application, such as a system administrator, an end-user, system designer or developer, by way of non-limiting example. Each type of user may have a set of access privileges for accessing aspects or resources of the application, and some of the set of access privileges of one user type may be different than the set of access privileges of another user type. Obtaining data regarding the application or service may include obtaining a starting page or starting point of the application and domains that can be included in the testing. The detection service identifies a set of resources or aspects as described above with respect to step 704, such as uniform resource identifiers, uniform resource locators, or HTTP requests, that each identified user or user type is authorized to access.

The detection service then may obtain 804 responses from the application or service for a user $U_{MAX}$ whose access privileges are equal to or exceed the access privileges of every other user on the list of users. In particular, step 804 may include establishing a session for the user $U_{MAX}$, crawling the application, and storing the responses in a database in association with the application and the user $U_{MAX}$, as described with respect to steps 706 and 708 of FIG. 7.

The detection service may obtain 806 information for the next user or user type in the list of users or user types. The information obtained may include authentication information, access privilege information for the user or user type, and resources or links that the user or user type should not be able to access based on the access privilege information. The detection service may then crawl 808 the application and obtain responses from the application as described above with respect to step 708 of FIG. 7. Crawling 808 may comprise establishing a cryptographically secure communications session, as described above at least with respect to step 706 of FIG. 7.

Figure 9:
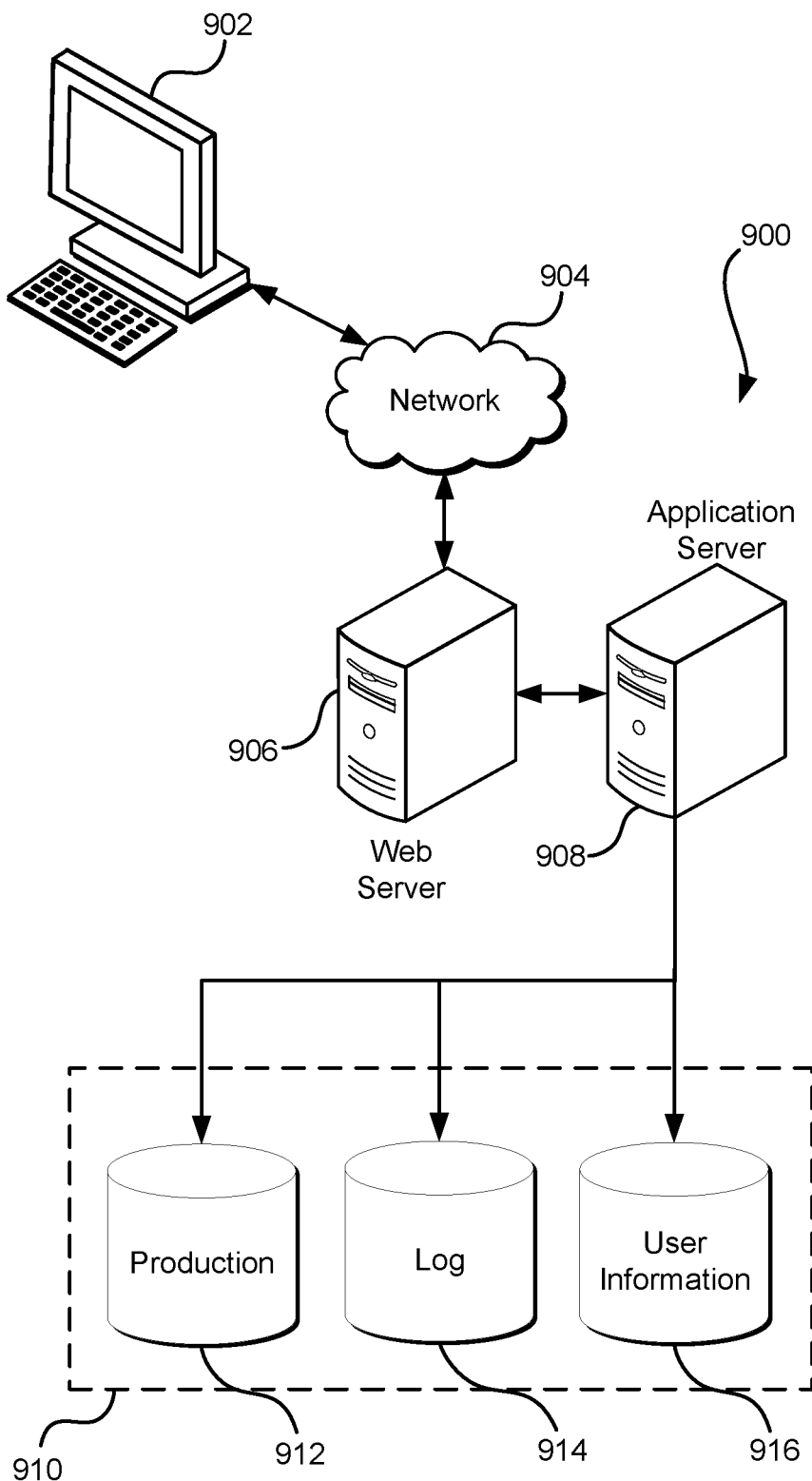
FIG. 9 illustrates an environment in which various embodiments can be implemented.

The detection service then obtains 810 a difference, for the response to access a resource or link, between the digest generated for the current user or user type being tested and the digest generated for the user $U_{MAX}$, as described above with respect to FIGS. 2 and 7. If the digest differential exceeds 812 or is outside of an acceptable similarity range or threshold value defined by the digest reference, as described above with respect to FIGS. 2 and 7, then the detection service may determine that the user or user type presents a privilege vulnerability and may cause a remediation action 814 to be taken, as discussed above with respect to FIG. 3. If the digest differential is within an acceptable range defined by the digest reference, then the detection service may determine that the user or user type does not present a privilege escalation vulnerability or risk and proceed to step 816. In step 816, the detection service reviews the list of users or user types to determine whether additional users or user types remain to be tested. If so, the detection service returns to step 806 to evaluate whether the user or user type poses a privilege escalation vulnerability or risk. If there are no users or user types remaining to be processed on the list, then the detection service may analyze 818 another application or service FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a set of reference signatures for a set of web pages of a web application, individual signatures of the set of reference signatures calculated using a fuzzy hashing algorithm, the fuzzy hashing algorithm producing matching values for matching but different inputs;
    initiating a session using authentication information of a user of the web application;

crawling the web application over the session to obtain a set of responses to requests made to the web application;

calculating a set of signatures for the set of responses, individual signatures calculated using the fuzzy hashing algorithm;

for a first signature in the set of signatures for the set of responses, performing a comparison between the first signature and a second signature of the set of reference signatures, the first signature and second signature both associated with a uniform resource identifier corresponding to a web page of the web application for which the user lacks authorization to access;

detecting, based at least in part on the comparison, that the user has an ability to exceed a set of privileges associated with the user; and indicating that the user has the ability to exceed the set of privileges.

2. The computer-implemented method of claim 1, wherein the set of signatures is obtained in connection with a second user associated with a second set of privileges for accessing the web application, the second set of privileges being sufficient to successfully access all web pages of the web application.

3. The computer-implemented method of claim 1, wherein detection that the user has the ability to exceed the set of privileges is as a result of a determination that the first signature is insufficiently dissimilar to the second signature.

4. The computer-implemented method of claim 1, wherein a service of a computing resource service provider crawls the web application using authentication information of the service.

5. A system, comprising:
one or more physical processors; and
memory that stores computer-executable instructions that, as a result of being executed, cause the system to:
determine a signature associated with an entity, the signature associated with an identifier available for access to the entity, the signature produced using a fuzzy hashing algorithm that produces matching values for a matching but different pair of inputs;
perform a comparison between the signature and a reference signature, the reference signature also associated with the identifier and produced using the fuzzy hashing algorithm; and
indicate a result of the comparison, the result indicating whether the entity is able to exceed a set of privileges associated with the entity.

6. The system of claim 5, wherein access privileges associated with the reference signature are different than access privileges associated with the entity.

7. The system of claim 5, wherein the reference signature corresponds to an indication of successful access to a resource associated with the identifier.

8. The system of claim 5, wherein the signature is determined at least in part by receiving a response to an attempt by a service of a computing resource service provider to access a resource associated with the identifier.

9. The system of claim 5, wherein performance of the comparison includes comparing pairs of fuzzy hash values generated from responses to requests for resource access, and the result indicating that the entity is able to exceed the set of privileges is based at least in part on a determination that the pair of fuzzy hash values are determined as being within a predetermined range of similarity.

10. The system of claim 5, wherein the signature and the reference signature are obtained in connection with establishment of one or more communications sessions with an application associated with the identifier.

11. The system of claim 5, wherein, exceeding the set of privileges is associated with a higher level of access than the entity should be permitted.

12. The system of claim 5, wherein exceeding the set of privileges is associated with access to information associated with a different entity.

13. A non-transitory computer-readable storage medium storing executable instructions that, as a result of being executed by one or more processors of a computer system, cause the computer system to at least:
determine a set of signatures related to access attempts for resource identifiers, the set of signatures comprising a first signature associated with a request to a first identifier using credentials of a user entity, the set of signatures produced using a fuzzy hashing algorithm that produces matching values for a matching but different pair of inputs;
perform a comparison between the first signature and a reference signature corresponding to the first signature by association with the first identifier, the reference signature produced using the fuzzy hashing algorithm; and
indicate whether the user entity is able to exceed a set of privileges associated with the user entity based at least in part on the comparison.

14. The non-transitory computer-readable storage medium of claim 13, wherein the instructions further comprise instructions that, as a result of being executed by the one or more processors, cause the computer system to, as a result of an indication that the user entity is able to exceed the set of privileges, perform a remediation action to limit risk of harm associated with a vulnerability caused by exceeding the set of privileges.

15. The non-transitory computer-readable storage medium of claim 13, wherein the first signature corresponds to an attempt to access a resource associated with the first identifier using authentication information of the user entity, and the user entity is unauthorized to access the resource.

16. The non-transitory computer-readable storage medium of claim 15, wherein the reference signature corresponds to a successful attempt to access the resource associated with the first identifier using authentication information of a user associated with universal access privileges to the resource.

17. The non-transitory computer-readable storage medium of claim 13, wherein the set of signatures is generated subject to the fuzzy hashing algorithm, and the indication that the user entity is able to exceed the set of privileges is based on a similarity of the first signature to the reference signature.

18. The non-transitory computer-readable storage medium of claim 13, wherein the first identifier corresponds to a first service of a computing resource service provider and the user entity corresponds to a second service of the computing resource service provider.

19. The non-transitory computer-readable storage medium of claim 13, wherein the first identifier corresponds to a resource of a computing resource service provider and the entity corresponds to a user of the computing resource service provider.

20. The non-transitory computer-readable storage medium of claim 13, wherein the user entity is unauthorized to access the resource, the comparison includes determination of a signature differential representing a level of similarity between the first signature and the reference signature, and an indication that the user entity is able to exceed the set of privileges is based at least in part on the signature differential exceeding a predetermined similarity threshold.

\* \* \* \* \*